(12) United States Patent
Cha et al.

(10) Patent No.: US 9,785,232 B2
(45) Date of Patent: Oct. 10, 2017

(54) METHOD OF DISPLAYING CONTENT AND ELECTRONIC DEVICE FOR PROCESSING THE SAME

(71) Applicant: Samsung Electronics Co., Ltd, Gyeonggi-do (KR)

(72) Inventors: Soon-Hyun Cha, Seoul (KR); Myung-Su Kang, Seoul (KR); Jung-Woo Lee, Gyeonggi-do (KR); Jae-Wan Cho, Gyeonggi-do (KR); Sun-Min Hwang, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 300 days.

(21) Appl. No.: 14/098,047

(22) Filed: Dec. 5, 2013

(65) Prior Publication Data
US 2014/0152553 A1 Jun. 5, 2014

(30) Foreign Application Priority Data
Dec. 5, 2012 (KR) .......................... 10-2012-0140382

(51) Int. Cl.
*G06F 3/01* (2006.01)
*G06F 3/0481* (2013.01)

(52) U.S. Cl.
CPC ............ *G06F 3/013* (2013.01); *G06F 3/0481* (2013.01); *G06F 2203/04102* (2013.01)

(58) Field of Classification Search
CPC ..... G06F 1/1652; G06F 3/0414; G06F 1/1626
USPC ........................................ 345/156, 173, 618
See application file for complete search history.

(56) References Cited

U.S. PATENT DOCUMENTS

| 6,157,410 A * | 12/2000 | Izumi et al. .................. 348/445 |
| 8,847,991 B1 * | 9/2014 | Upson ...................... G09G 5/00 |
| | | 345/649 |
| 8,947,382 B2 * | 2/2015 | Winkler et al. ............... 345/173 |
| 8,988,381 B1 * | 3/2015 | Kim ...................... G06F 1/1652 |
| | | 345/108 |
| 2006/0176243 A1 * | 8/2006 | Yeh ................................ 345/30 |
| 2010/0011291 A1 * | 1/2010 | Nurmi ................... G06F 3/0414 |
| | | 715/702 |
| 2011/0134144 A1 | 6/2011 | Moriwaki |
| 2011/0187681 A1 | 8/2011 | Kim et al. |
| 2012/0092363 A1 * | 4/2012 | Kim et al. ..................... 345/618 |
| 2012/0306910 A1 * | 12/2012 | Kim ....................... H04N 13/04 |
| | | 345/619 |
| 2013/0036638 A1 * | 2/2013 | Kwack et al. .................. 40/515 |
| 2013/0100053 A1 * | 4/2013 | Kang ........................ G06F 3/03 |
| | | 345/173 |
| 2014/0152553 A1 * | 6/2014 | Cha et al. ...................... 345/156 |

FOREIGN PATENT DOCUMENTS

| KR | 10-2006-0018625 | 3/2006 |
| KR | 10-2010-0027501 | 3/2010 |

* cited by examiner

*Primary Examiner* — Ricardo L Osorio

(57) ABSTRACT

A method in an electronic device comprises when a display unit is deformed, determining a display area visible to a user, and displaying content on the confirmed display area. An apparatus for displaying content on an electronic device comprises a processing circuit configured to detect that a flexible display unit is bended, recognize at least a part of a user's body, determine which display area is visible to the user based on the user position; and move at least part of content on the visible display area.

20 Claims, 10 Drawing Sheets

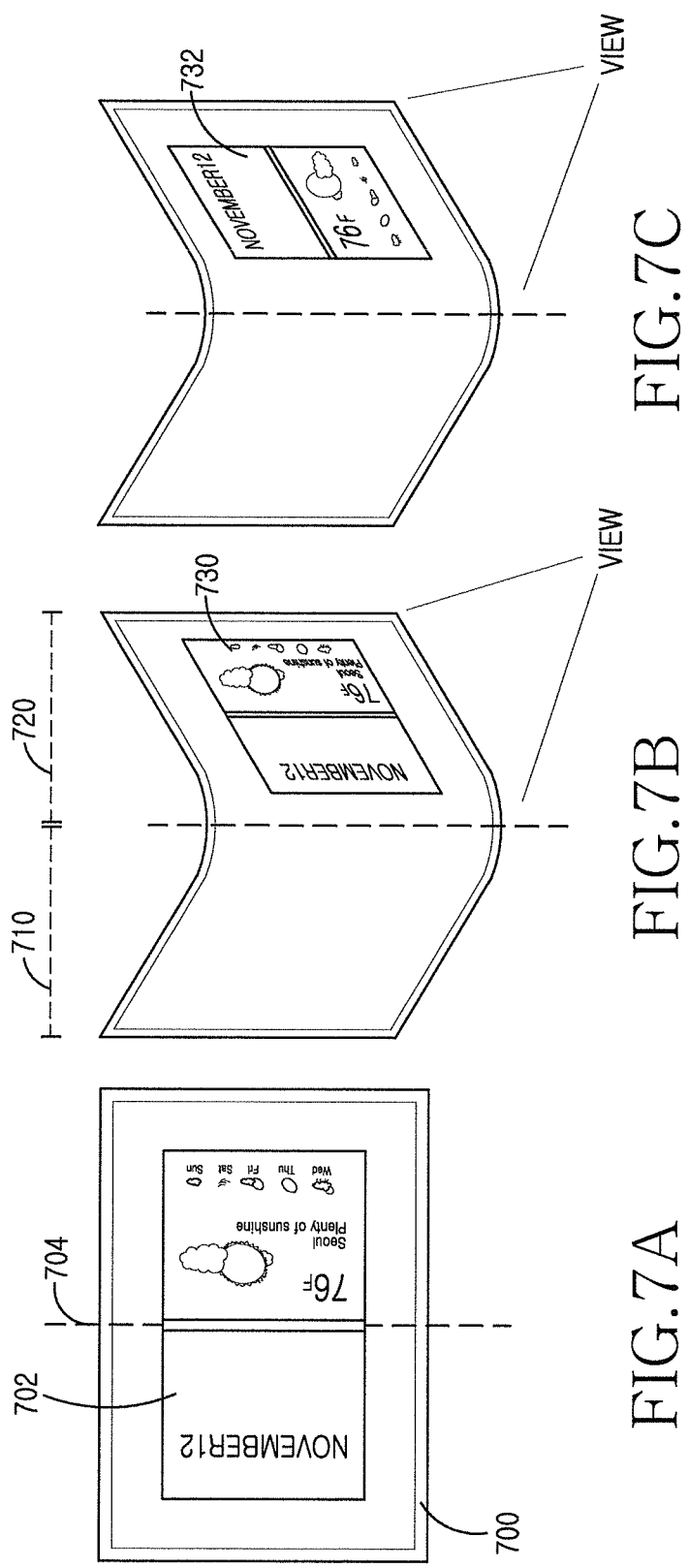

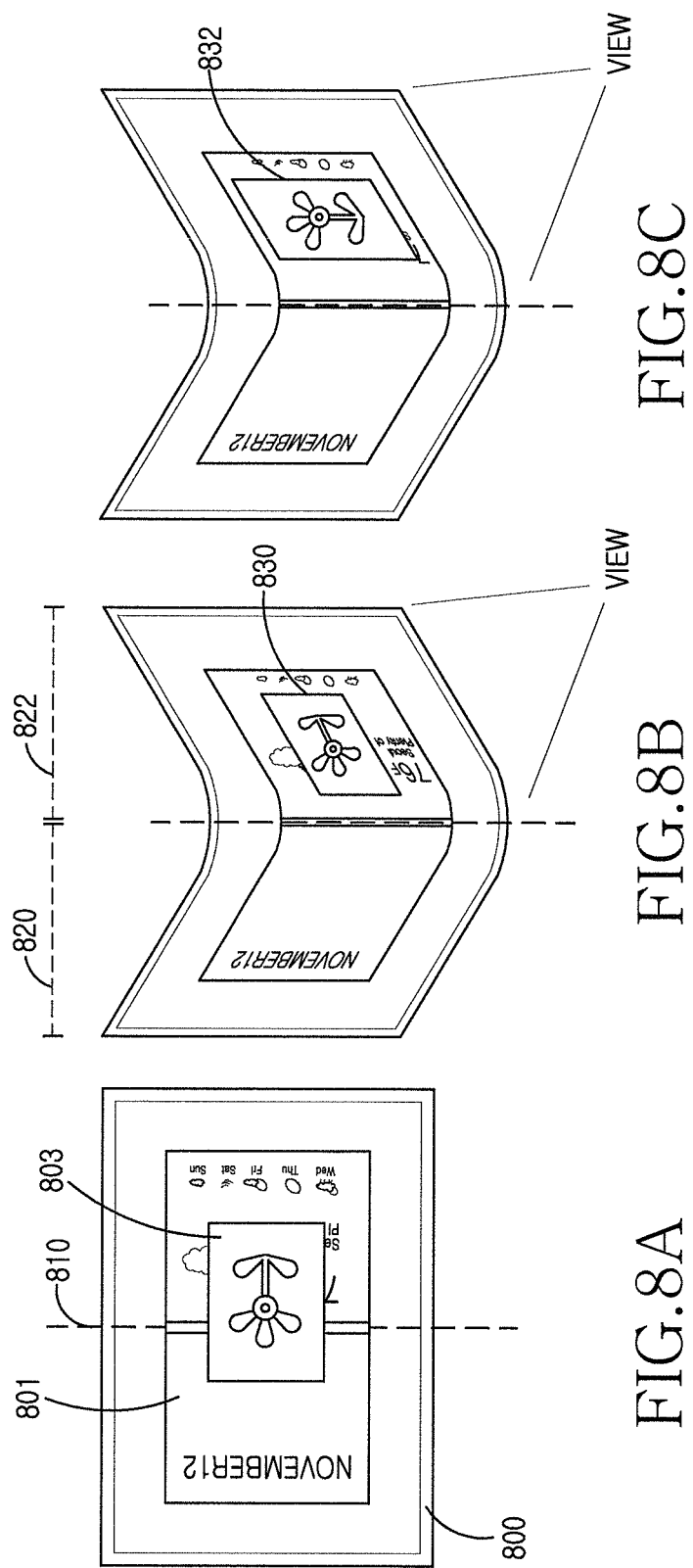

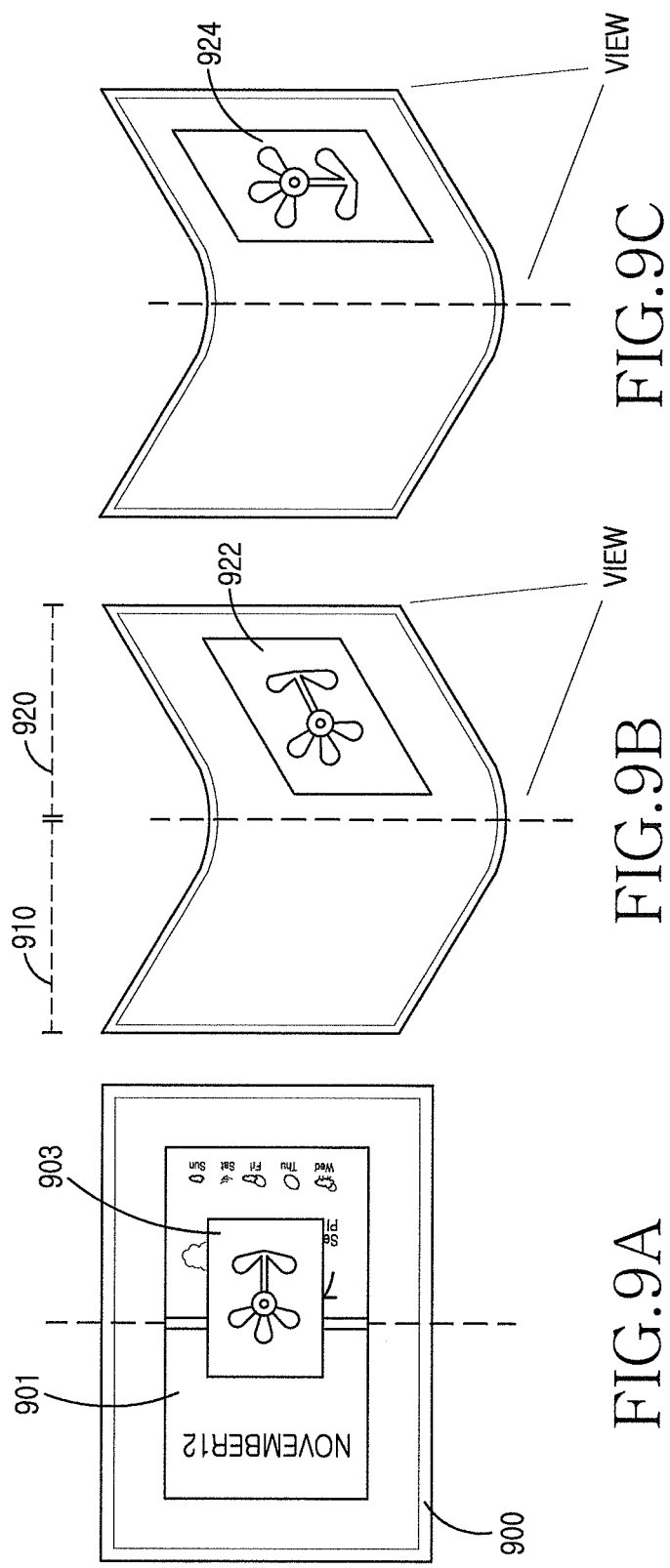

METHOD OF DISPLAYING CONTENT AND ELECTRONIC DEVICE FOR PROCESSING THE SAME

PRIORITY

The present application is related to and claims priority under 35 U.S.C. §119 to an application filed in the Korean Intellectual Property Office on Dec. 5, 2012 and assigned Serial No. 10-2012-0140382, the contents of which are incorporated herein by reference.

TECHNICAL FIELD

The present disclosure relates generally to a method of displaying contents and an electronic device for processing the same.

BACKGROUND

Due to development of electronic communication industries, electronic devices such as mobile terminals (cellular phones), electronic notes, or personal digital assistants become necessities of modern society and important means for transferring rapidly changed information.

Furthermore, recently, there is a trend to apply flexible displays to the electronic devices. Since a flexible display can be bent or folded, it is expected to develop a limited field of the typical display.

As shown in FIG. 1, an electronic device with a typical flexible display has an appearance of a typical electronic device. It is advantageous that the flexible display is deformed by an external force. However, content displayed on the deformed display may deviate from a visible area of a user.

For example, the user may deform the shape of the electronic device having the flexible display, as rolling paper.

A visible area of the deformed electronic device becomes smaller when the flexible display is deformed. This is because a portion of the visible area is changed to an invisible area according to shape deformation. A portion of or all contents having been displayed before the shape is deformed may be displayed in the invisible area. Here, a display area facing an opposite direction of the user becomes the invisible area, when the electronic device is rolled.

In this case, a user moves content displayed on the invisible area to the visible area by a gesture like touch and drag and allows the content to be continuously displayed.

In the drawing, contents displaying procedure is illustrated which is performed in an electronic device which displays an execution screen of an application providing calendar and weather information.

That is, an electronic device (a) displaying the application execution screen is rolled by a user as the paper is rolled, and only a weather portion of a lower end portion in the application execution screen is displayed (b). Then, the user moves the application execution screen to allow the calendar and weather portions to be displayed (c) in the visible area.

Accordingly, contents displayed in a flexible display having a deformed shape may deviate from a user's view.

SUMMARY

To address the above-discussed deficiencies, it is a primary object to provide an apparatus and method for changing contents display position according to an appearance deformation of a display unit in an electronic device.

Another object of the present disclosure is to provide an apparatus and method for determining contents display position by tracking a user in an electronic device.

Another object of the present disclosure is to provide an apparatus and method for determining a watched area corresponding to a visible area of a user in a deformed display unit in an electronic device.

Another object of the present disclosure is to provide an apparatus and method for displaying content while reducing power consumption in an electronic device.

According to an aspect of the present disclosure, a method of displaying contents in an electronic device, includes: when a display unit is deformed, confirming a display area corresponding to a user's visible area in the deformed display unit; and displaying contents on the confirmed display area.

The method may further includes displaying at least one content, distinguishing an element watched by a user among the displayed elements, and displaying the content watched by the user on the confirmed display area.

Determining the visible display area may include obtaining information regarding a user's eye direction and determining the display area visible to at least one user.

The display of the content on the visible display area may include when a plurality of display areas corresponding to users are confirmed, displaying different elements respectively on the plurality of display areas, wherein the displayed different elements are distinguished for each user according to each user's eye direction among the displayed contents.

The displaying of the content on the confirmed display area may include adjusting at least any one of a size, a resolution, a direction of the displayed content and displaying the adjusted content.

The displaying of the content on the confirmed display area may include stopping the displays of contents that the user does not watch among the displayed contents.

According to another aspect of the present disclosure, an electronic device includes a display unit being deformable and displaying contents, and at least one processor, wherein, when the display unit is deformed, the processor determines a display area corresponding to a user's visible area in the deformed display unit, and displays contents on the confirmed display area.

The processor may display at least one content, distinguish contents watched by a user among the displayed contents, and displays the content watched by the user on the confirmed display area.

The processor may obtain information confirming a user's eye direction, and confirms a display area corresponding to at least one user.

When a plurality of display areas corresponding to users are confirmed, the processor may display different contents respectively on the plurality of display areas, and the displayed different contents are distinguished for each user according to each user's eye direction among the displayed contents.

The processor may adjust at least any one of a size, resolution, a direction of the displayed content and displays the adjusted content.

The processor may stop the display of elements that the user does not watch among the displayed contents.

A method for display content on an electronic device comprises detecting that a flexible display unit is bended, recognizing a user's position, determining which display area is visible to the user based on the user position and moving at least part of content on the visible display area.

determining the visible display area comprises obtaining information regarding a position of user's eye, and determining the visible display area corresponding to the position of user's eye.

The method further comprises distinguishing at least one element on the content watched by a user among the displayed elements, and displaying the distinguished element on the visible display area.

An apparatus for displaying content on an electronic device, comprising a processing circuit configured to detect that a flexible display unit is bended, recognize at least a part of a user's body, determine which display area is visible to the user based on the user position; and moving at least part of content on the visible display area.

The user's body is user's eye and the visible display area may correspond to the position of user's eye.

The processing circuit may be configured to distinguish at least one element on the content watched by the user among the displayed elements, and display the distinguished element on the visible display area.

The processing circuit may be configured to divide the bended display unit into a plurality of substantially flat areas and display the content on one of the plurality of substantially flat areas.

The content watched by the user may be determined based on the user's eye movement.

According to another aspect of the present disclosure, a non-transitory computer readable medium having a program recorded thereon, which, when executed by a computer, performs a method of displaying contents, is disclosed, the method including when a display unit is deformed, determining a display area corresponding to a user's visible area in the deformed display unit, and displaying contents on the confirmed display area.

Before undertaking the DETAILED DESCRIPTION below, it may be advantageous set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A, 7B and 7C illustrate screens on a deformed display in an electronic device according to an embodiment of the present disclosure;

FIGS. 8A, 8B and 8C illustrate screens on a deformed display in an electronic device according to an embodiment of the present disclosure;

FIGS. 9A, 9B and 97C illustrate screens on a deformed display in an electronic device according to an embodiment of the present disclosure.

DETAILED DESCRIPTION

FIGS. 2 through 10C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Preferred embodiments of the present disclosure will be described herein below with reference to the accompanying drawings. In the following description, detailed descriptions of well-known functions or constructions will be omitted since they would obscure the disclosure in unnecessary detail. Also, the terms used herein are defined according to the functions of the present disclosure. Thus, the terms may vary depending on user's or operator's intentions or practices. Therefore, the terms used herein must be understood based on the descriptions made herein.

In below, it is described for an apparatus and method for changing contents display position according to appearance deformation of a display unit by tracking a user and determining the content display position in an electronic device according to an embodiment of the present disclosure.

The electronic device can include a flexible display capable of being deformed as being bent, curved, folded, rolled, stretched, twisted, unfolded, or wrinkled by an external force.

In addition, the electronic device can be a portable electronic device including a portable terminal, a mobile terminal, a media player, a tablet computer, a handheld computer, or a personal digital assistant, or can also be an any portable electronic device having two or more functions combined among the above-described devices.

Figure 1:
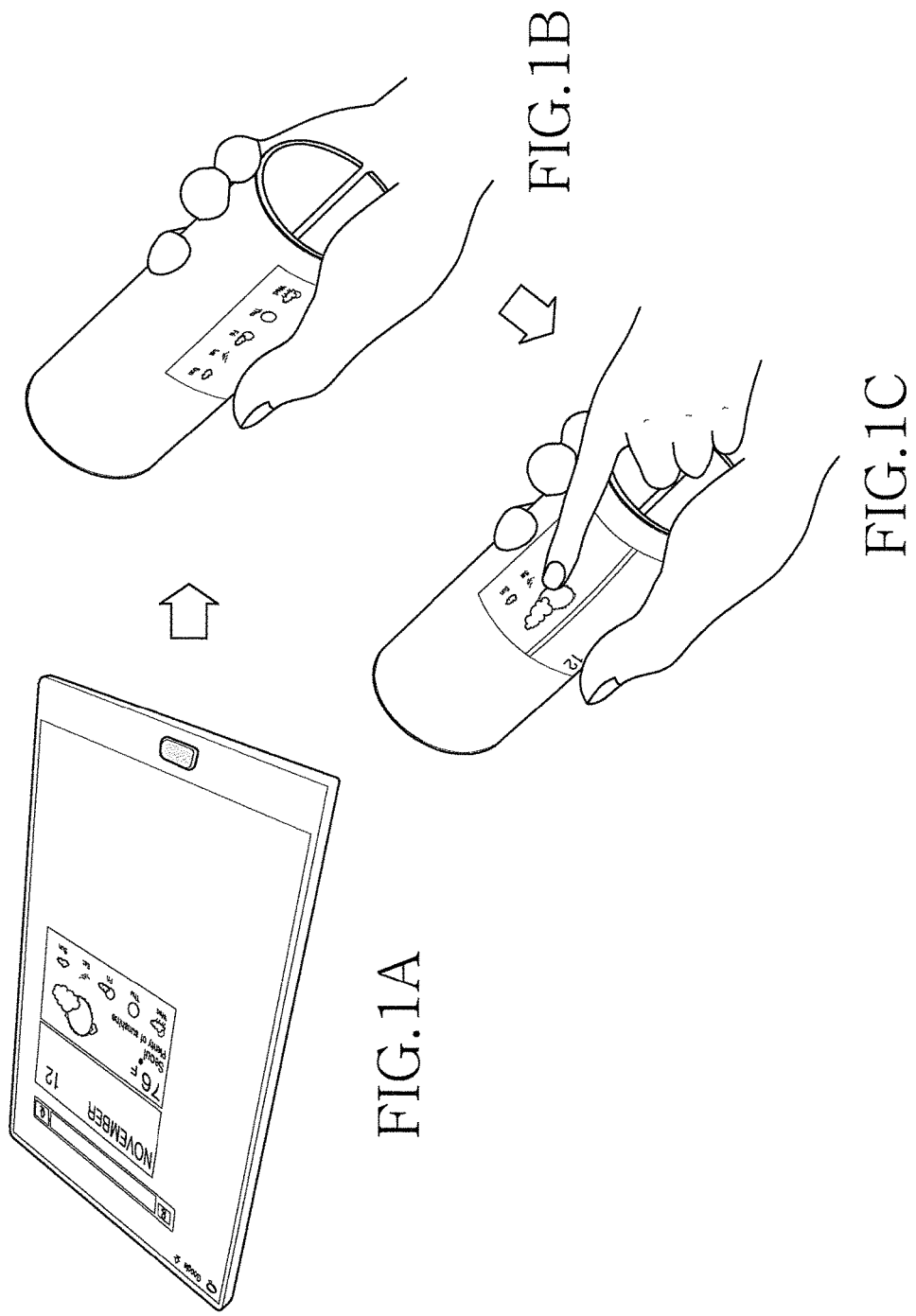
FIGS. 1A, 1B and 1C illustrate a screen displaying content in an electronic device to which a typical flexible display is applied.
Figure 2:
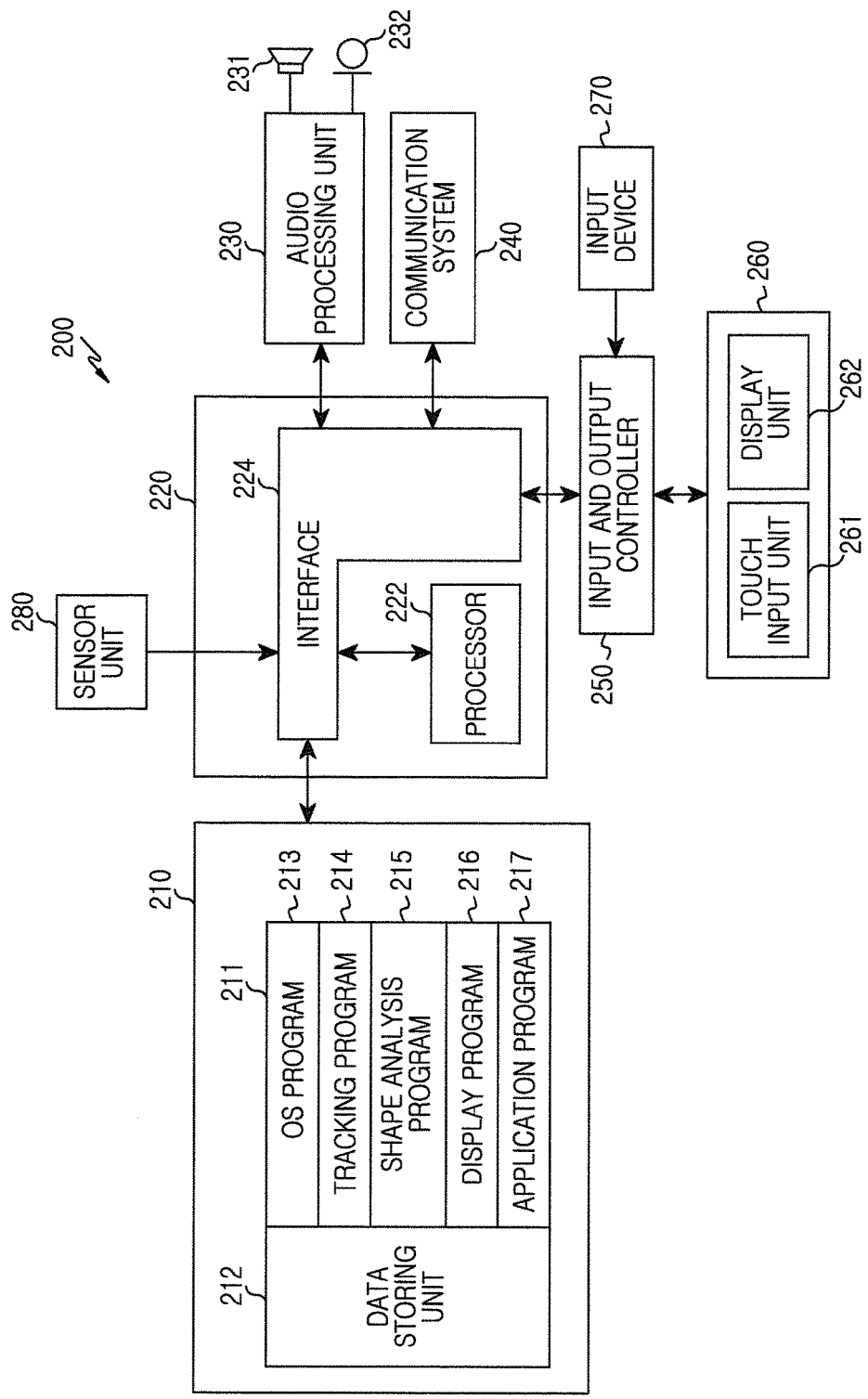
FIG. 2 is a block diagram illustrating a configuration of an electronic device displaying content according to an embodiment of the present disclosure.

FIG. 2 is a block diagram illustrating a configuration of an electronic device displaying contents according to an embodiment of the present disclosure.

As shown in FIG. 2, the electronic device 200 can include a memory 210, a processor unit 220, an audio processing unit 230, a communication system 240, an input and output controller 250, a touch screen 260, and an input device 270. Here, at least one component of the above-described configuration can be in plural. According to an example, the electronic device 200 can include a plurality of memories or a plurality of communication systems.

The memory 210 can include a program storing unit 211 storing programs for controlling operations of the electronic device 200 and a data storing unit 212 storing data generated during program execution. For example, the data storing unit 212 can store various updatable data for storage such as a phone book, outgoing messages, incoming messages, reference values used for determining deformation of the display unit 262, and reference values used for determining a display area facing toward a user among a deformed display area.

The program storing unit 211 can include an operating system program 213, a tracking program 214, a shape analysis program 215, a display program 216, and at least one application program 217. Here, programs stored in the program storing unit 211 can be represented as instruction sets which are sets of instructions.

The operation system program 213 can include various software elements controlling general system operations. These controls for the general system operations mean, for example, memory management and control, storage hardware (devices) control and management, power control and management, etc. This operating system program 213 also performs a function of enabling smooth communication between various hardware (devices) and program elements (modules).

The tracking program 214 can include various software elements for tracking a user who watches content displayed through the electronic device 200. Typically, the tracking program 214 can confirm a face or a viewpoint of a user who watches the content by using a recognition algorithm.

At this time, the tracking program 214 can determine a watched content by a user, and a watched area of a deformed display unit as well as the user who watches the content.

The watched content means contents that the user closely watches among multiple contents being displayed, and the tracking program 214 can confirm the watched content by using information sensed by a sensor which can track movement or a focus of the pupils of the user.

At this time, the tracking program 214 can confirm contents, which is last activated, as the watched content before the display unit 262 is deformed.

For another example, the tracking program 214 can confirm contents that the user watches for a long time, namely, contents that the eyes of the user stay for the longest time as the watched content before the display unit 262 is deformed.

For another example, the tracking program 214 can confirm contents that the user last watches, namely, contents that the eyes of the user last stay as the watched content before the display unit 262 is deformed.

In addition, the watched area means an area facing toward the user among display areas which are deformed and divided in multiple directions. The tacking program 214 can confirm the watched area by using information obtained through a sensor or a camera capable of recognizing the user.

The tracking program 214 can determine a user who watches contents, a watched content that the user watches, and a watched area in the deformed display unit by using information sensed by the sensor unit 280.

The shape analysis program 215 can include various software elements for confirming shape deformation of the electronic device 200 or the display unit 262.

That is, the shape analysis program 215 can sense any shape deformation such as being stretched, contracted, curved, folded, twisted, bent, or unfolded. This shape deformation can be used to figure out a viewpoint for correcting contents display position.

The display program 216 can include various software elements for providing and displaying graphic on the touch screen 260. A term graphic is used as a meaning including text, a web page, an icon, a digital image, a video, and an animation, etc.

In addition, when the display unit 262 is deformed according to an embodiment, the display program 216 can automatically correct a display position, a size, or a resolution of contents in accordance with a direction and a size of the deformed display unit 262 and display the corrected content.

According to an embodiment, the display program 216 can process the content display position to allow it to be changed to the watched area, and display the content At this time, the display program 216 can process the watched content that the user watches among currently displayed contents and allow it to be displayed on the watched area.

Furthermore, the display program 216 can process contents besides the watched content among the currently displayed contents and allow them not to be displayed.

The display program 216 can display the currently displayed contents in different directions and allow multiple users to simultaneously watch different contents.

The application program 217 can include software elements for at least one application program installed in the electronic device 200.

The program storing unit 211 can include a gesture analysis program which analyzes gestures of the user.

The gesture analysis program can analyze user's gestures sensed on the touch screen 260 of the electronic device 200.

The gestures mean to form touch patterns on the touch screen 260 of the electronic device 200. The touch is performed on the touch screen 260 of the electronic device 200 by an external input device such as a user's finger or a stylus pen. The gestures mean to form drags of uniform patterns in a state where touches are sustained on the touch screen 260. According to circumstances, the gestures also mean the drags in a state where the touches are sustained and even releases of the touches.

The programs stored in the program storing unit 211 can be executed on a hardware configuration. According to an embodiment, the electronic device 200 can include a tracking module, a shape deformation module, and a display module, and the like.

The processor unit 220 can include at least one processor 222 and an interface 224. Here, the processor 224 and the interface 224 can be integrated into at least one integrated circuit or implemented as separate elements.

The interface 224 can play a role of a memory interface controlling an access control of the processor 222 to the memory 210.

The interface 224 can further play a role of a peripheral device interface controlling connections between input and output peripheral devices of the electronic device 200 and the processor 222.

The processor 222 can control a display position of contents to be changed by using at least one software program. For example, when the display unit 262 is deformed, the processor 222 can include a display processor (not shown) which automatically corrects a display position, a size, or a resolution of contents in accordance with a direction and a size of the deformed display unit 262 and displays the corrected content. According to an embodiment, the function of changing the display position of the content in the electronic device 200 can be performed by using software such as the program stored in the memory 210 or hardware such as the display processor. The function of changing the display position of the content in the electronic device 200 can be automatically executed when the display unit 262 is deformed or can be executed in case where a gesture input such as a touch input, a menu input, or a button input allowing the function to be executed is sensed.

The audio processing unit 230 provides an audio interface between the user and the electronic device 200 through the speaker 231 and the microphone 232.

The communication system 240 performs a communication function for voice communication or data communication of the electronic device 200. At this time, the communication system 240 can be divided into a plurality of communication sub-modules supporting heterogeneous communication networks. For example, the communication networks can include, but are not limited to, a global system for mobile communication (GSM) network, an enhanced data GSM environment (EDGE) network, a code division multiple access (CDMA) network, a wideband code division multiple access (W-CDMA) network, a long term evolution (LTE) network, an orthogonal frequency division multiple Access (OFDMA) network, a wireless LAN, a Bluetooth network, and a near field communication (NFC) network.

The input and output controller 250 provides an interface between an input and output device such as the touch screen 260 and the input device 270 and the interface 224.

The touch screen 260 is the input and output device performing information input and output and can include a touch input unit 261 and the display unit 262.

The touch input unit 261 provides touch information sensed by a touch panel to the processor unit 220 through the input and output controller 250. At this time, the touch input unit 261 changes the touch information to a command structure such as touch_down, touch_move, and touch_up, and provides the changed command structure to the processor unit 220, and generates input data allowing the function of changing the display position of the content to be executed according to an embodiment of the present disclosure.

The display unit 262 displays state information on the electronic device 200, characters input by the user, moving pictures and still pictures. For example, the display unit 262 can be deformed by an external force as being bent, curved, folded, rolled, stretched, twisted, unfolded, or wrinkled.

In addition, the display unit 262 displays contents whose position, size, and resolution are corrected according to a direction and a size of the deformed display unit 262 according to an embodiment of the present disclosure.

The input device 270 provides input data generated by user's selection to the processor unit 220 through the input and output controller 250. For example, the input unit 270 includes only control buttons for controlling the electronic device 200. For another example, the input device 270 can include a key pad for receiving input data from the user.

This input device 270 generates input data allowing a function of changing contents display position to be executed according to an embodiment of the present disclosure.

The sensor unit 280 can sense any type of deformation of being stretched, contracted, curved, folded, twisted, bent, and unfolded of the electronic device 200. These deformations correspond to the deformation of the display unit 262. For example, the sensor unit 280 can sense any one type of deformation of being stretched, contracted, curved, folded, twisted, bent, and unfolded. Also, the sensor unit 280 can measure a degree of the deformation of being stretched, contracted, curved, folded, twisted, bent, and unfolded.

Furthermore, the sensor unit 280 can sense a user who watches contents being displayed. This is for determining of a watched area by the user in the deformed display unit 262.

Also, the sensor unit 280 can include a sensor capable of tracking the user, a camera, and at least one sensor capable of sensing an appearance change, and the sensor unit 280 can be mounted in the display unit 262 or separately from the display unit 262. In certain embodiments, the sensor unit 280 also comprises an accelerometer that measures acceleration in three dimensions to measure the position of the mobile device.

Information sensed by this sensor unit 280 can be used for the operations of the programs stored in the memory 210.

Although not shown in the drawing, the electronic device 200 can further include components for providing additional functions and software for operating them. The components can include a camera module for capturing images or moving pictures, a broadcast reception module for receiving broadcasts, a digital sound source playing module such as an MP3 module, an NFC module for near field communication, and a proximity sensor module for proximity sensing.

Figure 3:
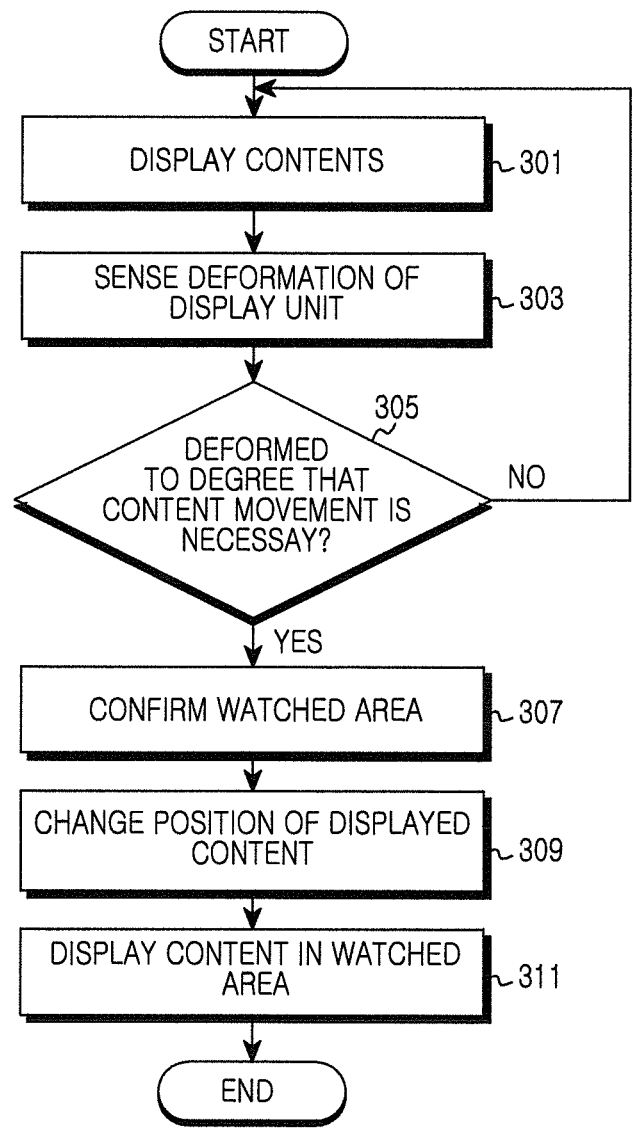
FIG. 3 is a flow chart illustrating a procedure of displaying contents in an electronic device according to an embodiment of the present disclosure.

FIG. 3 is a flowchart illustrating a procedure of displaying content in an electronic device according to an embodiment of the present disclosure.

Referring to FIG. 3, the electronic device includes a flexible display unit as a display means and is also called as a flexible device.

In this electronic device, namely, the flexible device, the flexible display unit can be deformed by an external force. Here, the deformation means that a shape of the display unit is changed, by the external force, as being bent, curved, folded, rolled, stretched, twisted, unfolded, or wrinkled.

First, the electronic device displays contents on the display unit in operation 301. Here, the contents are objects able to be displayed on the display unit, which include image data, multimedia data, or document data, and further include execution screens of applications installed in the electronic device and a home screen including icons for executing the applications. Namely, the content can be all elements forming a screen displayed on the electronic device.

In addition, the electronic device can simultaneously display a plurality of contents. As an example, the electronic device can simultaneously display a moving picture playing screen on a browser screen. However, it is described below assuming that the electronic device displays one content. A situation that a plurality of content are displayed will be described in relation to FIG. 4.

Then, the electronic device proceeds to operation 303 and senses the deformation of the display unit. The electronic device proceeds to operation 305 and detects that the display unit is deformed such an extent that movement of the content is necessary. Namely, the electronic device determines whether the content displayed on the deformed display unit deviates from a visible region.

Here, the content movement means that the content, which deviates from the visible area (namely, a field of view of a user) and is displayed according to the deformation of the display unit, is moved to the visible area. The electronic device includes sensors for confirming a deformation type such as being stretched, contracted, curved, folded, twisted, bent and unfolded, and a degree of the deformation. These sensors can be used in plural, and mounted in the display unit or separately from the display unit.

When the display unit is deformed such an extent that the movement of the content is not necessary in operation 305, the electronic device determines that the content displayed on the deformed display unit does not deviate from the visible area, proceeds to operation 301 and displays the content. That is, the electronic device continuously displays the content without changing a previous display position of the content even when the display unit is deformed.

On the other hand, when determining that the display unit is deformed such an extent that the content movement is necessary in operation 305, the electronic device determines that the content displayed on the deformed display unit deviates from the visible area, proceeds to operation 307, and determines the visible area of the deformed display unit. In operation 307, the electronic device determines a watched area, namely a display area facing toward the user, corresponding to the visible area of the user in the deformed display unit. As an example, when the user folds the display unit such that rear surfaces thereof are superimposed, areas in which the content can be displayed will be a front surface and a rear surface of the deformed display unit, namely the folded display unit. That is, a display area before the display unit is deformed as being folded is divided into a first area (a left area) and a second area (a right area) with a fold line as the center, and, when the first area becomes the front surface of the deformed display unit, the second area can be the rear surface.

Here, the front surface means an area facing toward the user among the display areas which are deformed and divided in various directions. The rear surface is an area which does not face toward the user. That is, the watched area means an area on which the content can be displayed in a direction corresponding to the visible area of the user.

The electronic device according to an embodiment of the present disclosure can determine a watched area by using a sensor or a camera capable of tracking a user.

This method pertains to tracking the user and determining, as the watched area, a display area facing toward the user, and has an advantage in tracking an accurate user's position by using the sensor or the camera. But this method requires to be quipped with the sensor or the camera for tracking the user, thereby costing much money. That is because a plurality of sensors or cameras are necessary for tacking the user in the deformed display unit. As an example, in case where the electronic device can be deformed to be folded only in one designated direction and to display contents on two surfaces, a camera or a sensor is attached on at least one surface and it is determined whether the user is present in a corresponding direction.

However, in case where the electronic device can be deformed as being folded in an undesignated direction and display contents on a plurality of surfaces, a plurality of sensors or cameras are attached on a bezel of the display unit and it is determined whether a user is present in a corresponding direction.

As another example, the electronic device according to the present disclosure can determine the watched area by using a sensor capable of measuring a movement of the electronic device.

This method pertains to determining the watched area in a direction of deformation of the display unit on the basis of posture of the electronic device and can be implemented in less cost compared to the method of using the sensor or the camera. As an example, when detecting deformation that one side of the electronic device is folded toward the rear surface on the basis of reference posture, namely, posture of facing the user, the electronic device can determine a folded direction or a folded angle of the display unit to determine the watched area.

Having determined the watched area as described above, the electronic device proceeds to operation 308 and changes contents display position to the watched area. Then, the electronic device proceeds to operation 311 and allows the content to be displayed on the watched area. At this time, the electronic device can adjust a size of the content according to a size of the deformed display unit. As an example, when the display unit is folded in half, the watched area is also reduced in half. Therefore, the electronic device adjusts a size or a resolution of the displayed content and displays the adjusted content on the watched area.

That is, the electronic device automatically corrects the display position, the display size or the display resolution of the content according to the direction or the size of the deformed display unit and displays the corrected content.

The electronic device, which has moved the content to the watched area and displayed the content, terminates the present algorithm.

Figure 4:
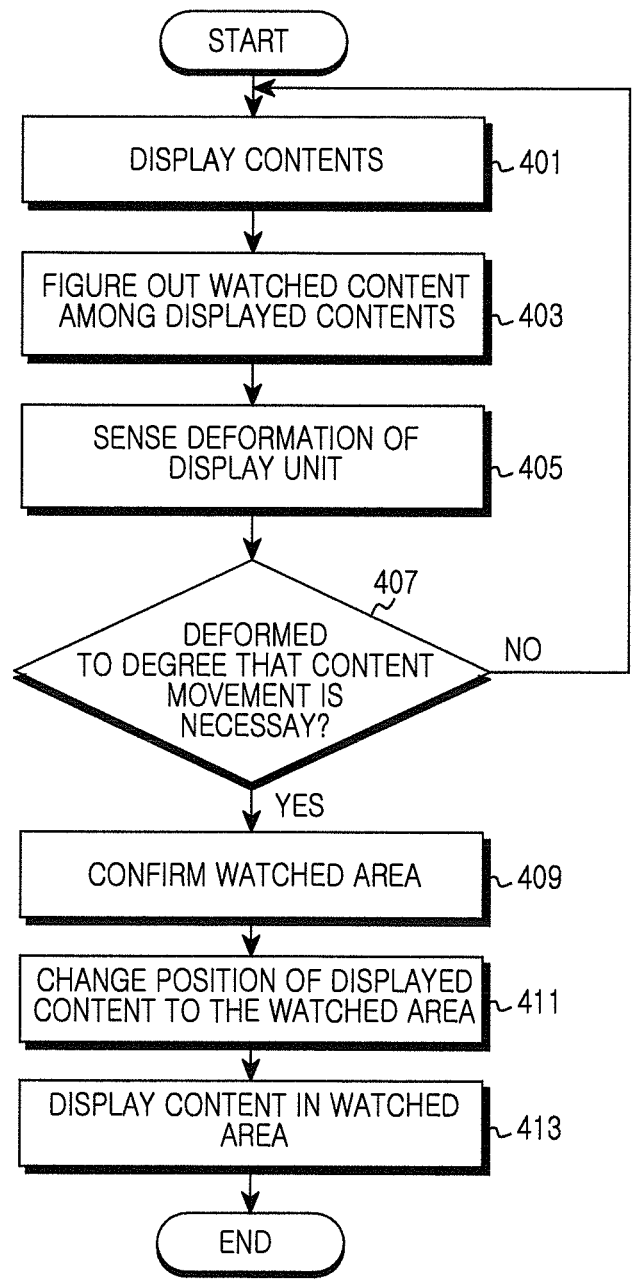
FIG. 4 is a flow chart illustrating a procedure of displaying contents in an electronic device according to another embodiment of the present disclosure.

FIG. 4 is a flowchart illustrating a procedure of displaying content in an electronic device according to another embodiment of the present disclosure.

Referring to FIG. 4, the electronic device includes a flexible display as a display means and is called as a flexible device.

In this display device, a display unit can be deformed by an external force. Here, the deformation means that a shape of the display unit is changed by the external force as being bent, curved, folded, rolled, stretched, twisted, unfolded, or twinkled.

First, the electronic device displays content on the display unit in operation 401. Here, the content is an object capable of being displayed on the electronic device, includes image data, multimedia data, or document data, and can further include execution screens of applications installed in the electronic device and a home screen including icons for executing the applications. In description below, it is assumed that the electronic device simultaneously displays a plurality of contents.

Thereafter, the electronic device proceeds to operation 403 and figures out a watched content among the displayed contents. Here, the watched content can be contents closely watched by a user among the plurality of displayed contents.

Typically, a size of the display unit of the electronic device is not large. Therefore the user can closely watch a plurality of elements in the content, when watching the displayed content. In certain embodiments, a closely watched element is determined based on movement or a focus of the pupils of the user, namely, content that the user actually watches.

At this time, the electronic device can distinguish the watched content from other displayed elements by a sensor capable of tracking the pupils of the user.

Then, the electronic device proceeds to operation 405 and senses deformation of the display unit. Then, the electronic device proceeds to operation 407 and determines that the display unit is deformed such an extent that movement of the watched content is necessary.

Here, the movement of the content means moving the watched content, which is displayed as deviating from a visible area according to the deformation of the display unit, to the visible area. The electronic device includes sensors for detecting a type of deformation as being stretched, contracted, curved, folded, twisted, bent, and unfolded, and a degree of the deformation. These sensors can be mounted on the display unit or separately from the display unit.

When the display unit is not deformed such an extent that movement of the watched content is necessary in operation 407, the electronic device determines that the displayed watched content does not deviate from the visible area on the deformed display unit, proceeds to operation 401 and displays the watched content.

On the contrary, when the display unit is detected as being deformed such an extent that the watched content needs to be moved in operation 407, the electronic device determines whether the watched content, which is displayed on the deformed display unit, deviates from the visible area, proceeds to operation 409 and determines the watched area. In operation 409, the watched area corresponding to a user's visible area is determined on the deformed display unit. The watched area means an area facing toward the user among the display areas deformed and divided in a plurality of directions, and an area that the content can be displayed in a direction corresponding to the user's visible area.

As described above, the electronic device can determine the watched area by using a sensor or a camera capable of tracking the user, or by using a sensor capable of measuring movement of the electronic device.

The electronic device, which has determined the watched area, proceeds to operation 411 and changes a position of the displayed watched content to the watched area. Then the electronic device proceeds to operation 413 and allows the watched content to be displayed on the watched area. At this time, the electronic device can adjust a size of the watched content properly according to the size of the deformed display unit.

That is, the electronic device automatically corrects a display position of the watched content according to the direction and size of the deformed display unit and displays the corrected watched content.

The electronic device, which has moved the watched content to the watched area and displayed the watched content, terminates the present algorithm.

Figure 5:
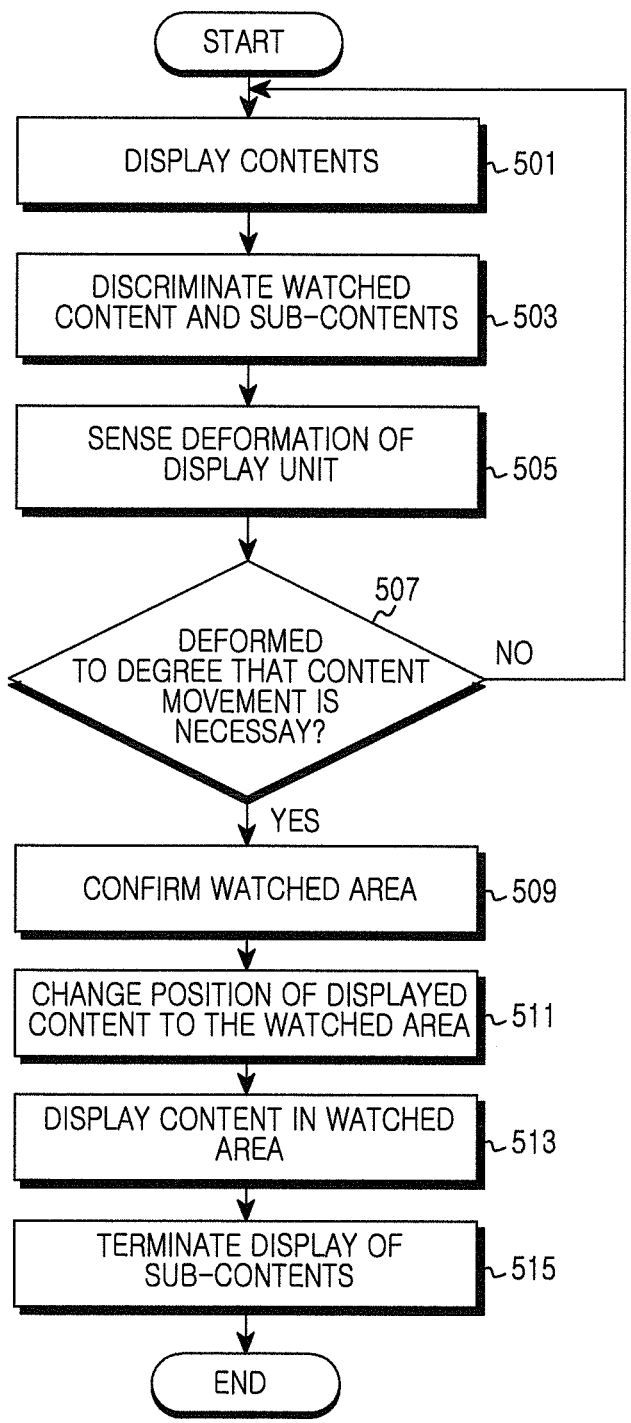
FIG. 5 is a flow chart illustrating a procedure of displaying contents in an electronic device according to another embodiment of the present disclosure.

FIG. 5 is a flowchart of a procedure of displaying contents in an electronic device according to another embodiment of the present disclosure.

Referring to FIG. 5, the electronic device includes a flexible display as a display means and is called as a flexible device. In this display device, a display unit can be deformed by an external force. Here, the deformation means that a shape of the display unit is changed by the external force as being bent, curved, folded, rolled, stretched, twisted, unfolded, or twinkled.

First, the electronic device displays content on the display unit in operation 501. Here, the content is an object capable of being displayed on the electronic device, includes image data, multimedia data, or document data, and can further include execution screens of applications installed in the electronic device and a home screen including icons for executing the applications.

In description below, it is assumed that the electronic device simultaneously displays a plurality of elements on a screen.

Then, the electronic device proceeds to operation 503 and distinguishes a watched element from other displayed elements. Here, the watched element can be contents closely watched by a user among a plurality of displayed contents, and rest of the contents can be defined as the non-watched elements.

Typically, a size of the display unit of the electronic device is not large. Therefore the user can closely watch a plurality of contents, when watching the displayed contents. However, in the present disclosure, a closely watched content is contents corresponding to a focus of the pupils of the user, namely contents that the user actually watches.

At this time, the electronic device can distinguish the watched content from the non-watched elements among the currently displayed contents through a sensor capable of tracking the pupils of the user.

Then, the electronic device proceeds to operation 505 and senses deformation of the display unit. Then the electronic device proceeds to operation 507 and determines that the display unit is deformed such an extent that movement of the watched content is necessary.

Here, the movement of the content means moving the watched content, which is displayed as deviating from a visible area according to the deformation of the display unit, to the visible area. The electronic device includes sensors for detecting a type of deformation as being stretched, contracted, curved, folded, twisted, bent, and unfolded, and a degree of the deformation. These sensors can be mounted on the display unit or separately from the display unit.

When the display unit is not deformed such an extent that the watched content needs to be moved in operation 507, the electronic device determines that the displayed watched content does not deviate from the visible area on the deformed display unit, proceeds to operation 501 and displays the watched content.

On the contrary, when the display unit is detected as being deformed such an extent that the watched content needs to be moved in operation 407, the electronic device determines whether the watched content, which is displayed on the deformed display unit, deviates from the visible area, proceeds to operation 509 and determines the watched area. In operation 509, the watched area corresponding to a user's visible area is determined on the deformed display unit. The watched area means an area facing toward the user among the display areas deformed and divided in a plurality of directions, and an area that the content can be displayed in a direction corresponding to the user's visible area.

As described above, the electronic device can detect the watched area by using a sensor or a camera capable of tracking the user, or by using a sensor capable of measuring movement of the electronic device.

The electronic device, which has determined the watched area, proceeds to operation 511 and changes a position of the displayed watched content to the watched area. Then, the electronic device proceeds to operation 513 and allows the watched content to be displayed on the watched area. At this time, the electronic device can adjust a size of the watched content properly according to the size of the deformed display.

That is, the electronic device automatically corrects a display position of the watched content according to the direction and size of the deformed display unit, and displays the corrected watched content.

Then, the electronic device proceeds to operation 515 and stops the display of the non-watched elements.

This pertains to reducing power consumption by displaying only the watched content that the user watches and stopping display of the non-watched elements that the user does not watch.

In the embodiment, it is described that the power consumption is reduced by stopping display of the non-watched elements. However, the electronic device according to the embodiment can apply, to non-watched elements, various ways capable of reducing power consumption such as reducing brightness of the non-watched elements.

The electronic device, which has displayed the watched content in the watched area as described above, terminates the present algorithm.

Figure 6:
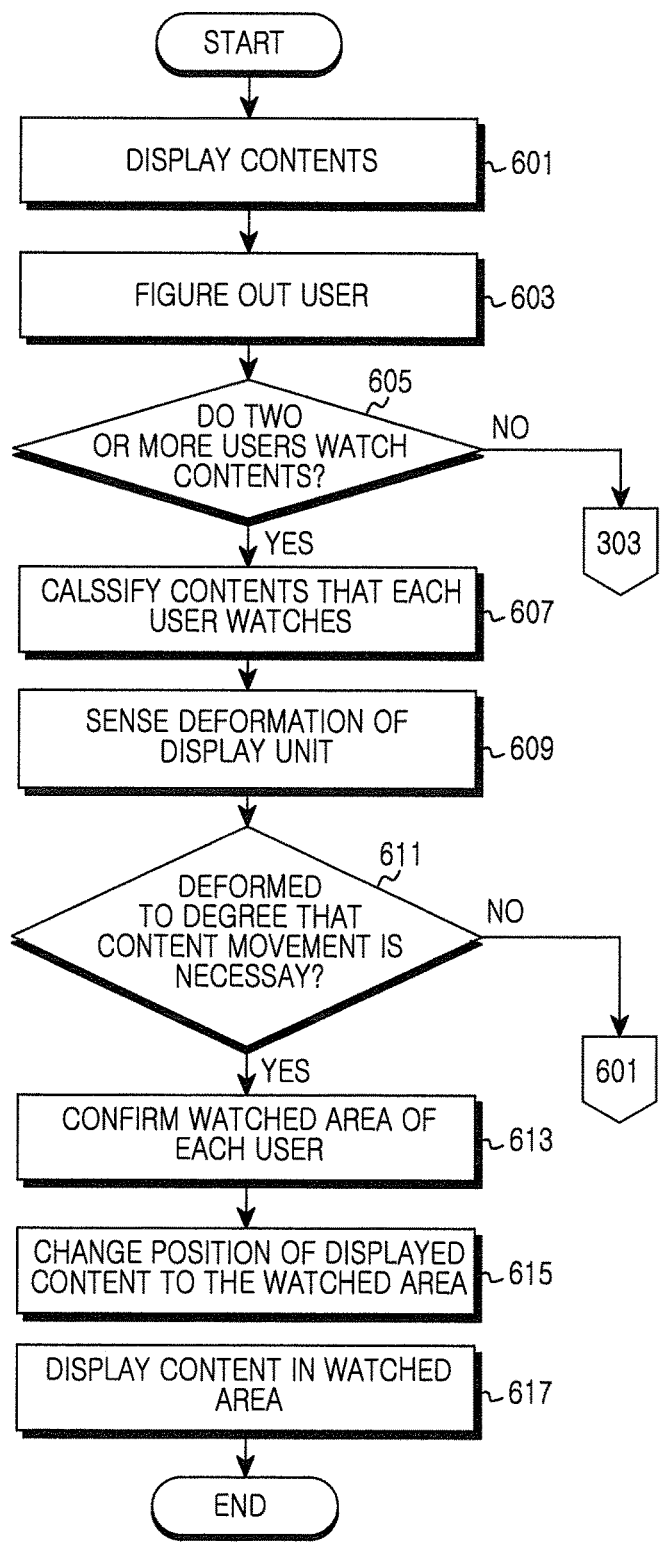
FIG. 6 is a flow chart illustrating a procedure of displaying contents in an electronic device according to another embodiment of the present disclosure.

FIG. 6 is a flowchart of a procedure of displaying content in an electronic device according to another embodiment of the present disclosure.

Referring to FIG. 6, the electronic device includes a flexible display as a display means and is called as a flexible device.

In this display device, a display unit can be deformed by an external force. Here, the deformation means that a shape of the display unit is changed by the external force as being bent, curved, folded, rolled, stretched, twisted, unfolded, or twinkled.

The electronic device can deform a shape of the display unit and differently set display directions of contents. As an example, when the display unit is folded to allow the rear surface to be superimposed, the electronic device can display the contents on front and rear surfaces of the folded display unit.

Then, the electronic device proceeds to operation 603 and figures out if a user is watching the displayed content. Then, the electronic device proceeds to operation 605 and determines whether two or more users watch the content.

At this time, the electronic device can figure out the user watching the displayed content by using a sensor or a camera capable of tracking the user.

In addition, the two or more users can watch contents displayed in each direction of the deformed display unit. For example, when the display unit of the electronic device is folded to display contents on front and rear surfaces of the display unit, one user can watch contents displayed on the front surface of the display unit and another user can watch contents displayed on the rear surface of the display unit.

At this time, the electronic device can display the same content or different contents on the front and rear surfaces of the display unit according to a user's request.

When one user watches contents in operation 605, the electronic device performs operation 303 in FIG. 3.

Whereas, when two or more users watch contents in operation 605, the electronic device proceeds to operation 607 and classifies contents that each user watches. Then, the electronic device proceeds to operation 609 and confirms whether deformation of the display unit is sensed.

Then, the electronic device proceeds to operation 611 and confirms the display unit is deformed such an extent that movement of the watched content is necessary.

Here, the movement of the content means moving the watched content, which is displayed as deviating from a visible area according to the deformation of the display unit, to the visible area. The electronic device includes sensors for confirming a type of deformation as being stretched, contracted, curved, folded, twisted, bent, and unfolded, and a degree of the deformation. These sensors can be mounted on the display unit or separately from the display unit.

When the display unit is not deformed such an extent that the watched content needs to be moved in operation 611, the electronic device proceeds to operation 601 and displays the watched content.

On the contrary, when the display unit is confirmed as being deformed such an extent that the watched content needs to be moved in operation 611, the electronic device proceeds to operation 613 and confirms the watched area. In operation 613, the watched area corresponding to a user's visible area is confirmed on the deformed display unit. The watched area means an area facing toward the user among the display areas deformed and divided in a plurality of directions, and an area that the content can be displayed in a direction corresponding to the user's visible area.

As described above, the electronic device can determine the watched area by using a sensor or a camera capable of tracking the user, or by using a sensor capable of measuring movement of the electronic device.

The electronic device, which has determined the watched area, proceeds to operation 615 and changes a position of the displayed watched content to the watched area. Then, the electronic device proceeds to operation 617 and allows the watched content to be displayed on the watched area. At this time, the electronic device can adjust a size of the watched content properly according to the size of the deformed display.

That is, the electronic device automatically corrects display positions of the contents according to the direction and size of the deformed display unit, and can display contents that different users respectively watch on the front and rear surfaces of the deformed display unit.

Having displayed the watched contents as described above, the electronic device terminates the present algorithm.

FIG. 7 illustrates screens on a deformed display unit in an electronic device according to an embodiment of the present disclosure Referring to FIG. 7, the electronic device is a flexible device including a flexible display as a display means.

In this display device, a display unit can be deformed by an external force. Here, the deformation means that a shape of the display unit is changed by the external force as being bent, curved, folded, rolled, stretched, twisted, unfolded, or twinkled.

That is, the electronic device can display contents through a deformed display unit. The content is an object capable of being displayed on the electronic device, includes image data, multimedia data, document data, or web browser screen. Furthermore, displaying the content can be displaying an application execution screen, or displaying a home screen including icons or widgets of applications.

FIG. 7A illustrates a screen of the electronic device displaying an application execution screen which provides calendar and weather information.

As described above, the display unit 700 of the electronic device is deformable.

As an example, the display unit 700 is foldable to allow the rear surface thereof to be superimposed with a reference line 704 as a center line as the newspaper is folded.

When deformed with contents 701 being displayed in a typical flexible display, the display unit does not display the content properly according to the deformed display unit whose appearance is changed only. That is, when the display unit is deformed in a state where the content is displayed, a shape of the display unit is changed and a portion of the displayed content deviates from a user's visible area.

When the display unit is folded in half, the content should have been displayed on the folded display unit. However, when the display unit is folded in half with the content being displayed, an application execution screen providing calendar and weather information is also displayed as being folded. Accordingly, a user of the electronic device can watch only a portion of the execution screen of the application providing the calendar and weather information.

In order to solve the above-described limitation, when the display unit is deformed in the electronic device according to the present disclosure, the electronic device confirms a watched area corresponding to the user's visible area.

In certain embodiments, the controller divides the bended display unit into a plurality of substantially flat areas and display the content on one of the plurality of substantially flat areas.

As an example, when the display unit is folded in half by the user, an area where the content can be displayed is divided into the front and rear surfaces. In this case, an area where the content can be displayed in a direction corresponding to the user's visible area can be a watched area.

At this time, the electronic device can confirm the watched area by using a sensor or a camera capable of tracking the user or confirm the watched area by using a sensor capable of measuring movement of the electronic device.

Then, the electronic device displays the currently displayed content on the watched area. At this time, the electronic device changes not only a display position of the content but also a size of the content according to a size of the deformed display unit. As an example, since a size of the watched area of the deformed display unit is reduced, it is better to make a size of the displayed content smaller and display the content FIG. 7B illustrates a screen for displaying, on a watched area 720, an execution screen of an application providing the calendar and weather information, which has been displayed, when the deformed display unit is divided into a non-watched area 710 and the watched area 720.

FIG. 7C illustrates a screen of the electronic device which automatically rotates the content having been displayed and displays the rotated content, when the deformed display unit is divided into a non-watched area and the watched area.

FIG. 7(c) illustrates the screen of the electronic device which rotates the content to allow the content to be displayed in a normal direction.

FIG. 8 illustrates screens on a deformed display unit in an electronic device according to an embodiment of the present disclosure.

Referring to FIG. 8, the electronic device is a flexible device including a flexible display as a display means.

In this display device, a display unit can be deformed by an external force. Here, the deformation means that a shape of the display unit is changed by the external force as being bent, curved, folded, rolled, stretched, twisted, unfolded, or twinkled.

That is, the electronic device can display contents through a deformed display unit. The content is an object capable of being displayed on the electronic device, includes image data, multimedia data, document data, or web browser screen. Furthermore, displaying the content can be displaying an application execution screen, or displaying a home screen including icons or widgets of applications.

Furthermore, the electronic device can simultaneously display a plurality of contents. As an example, the electronic device can simultaneously execute an image viewer on an execution screen of an application providing calendar and weather information.

FIG. 8A illustrates a screen of the electronic device which simultaneously displays the execution screen 801 of the application providing the calendar and weather information and an execution screen 803 of the image viewer.

As described above, a display unit 800 of the electronic device is deformable.

As an example, the display unit 800 is foldable to allow the rear surface thereof to be superimposed with a reference line 810 as a center line as the newspaper is folded.

When deformed with contents being displayed in a typical flexible display, the display unit does not display the content properly according to the deformed display unit whose appearance is changed only. That is, when the display unit is deformed in a state where the content is displayed, a shape of the display unit is changed and a portion of the displayed content deviates from a user's visible area.

When the display unit is folded in half, the content should have been displayed on the folded display unit. However, when the display unit is folded in half with the content being displayed, the displayed content is also displayed as being folded.

In order to solve the above-described limitation, when the display unit is deformed in the electronic device according to the present disclosure, the electronic device distinguishes a watched content that the user closely watches from other displayed contents.

At this time, the electronic device can distinguish the watched content among the currently displayed contents through a sensor capable of tracking a focus of the pupils of the user.

In addition, the electronic device confirms the watched area corresponding to the user's visible area in the deformed display unit.

As an example, when the display unit is folded in half by the user, an area on which contents can be displayed is divided into front and rear surfaces. In this case, an area where the content can be displayed in a direction corresponding to the user's visible area can be the watched area.

At this time, the electronic device can confirm the watched area by using a sensor or a camera capable of tracking the user or by using a sensor capable of measuring movement of the electronic device.

Then, the electronic device displays a watched content among the currently displayed contents on the watched area. At this time, the electronic device changes not only a display position of the content but also a size of the content according to a size of the deformed display unit. As an example, since a size of the watched area of the deformed display unit is reduced, it is better to make a size of the displayed content smaller and display the content. The electronic device can also adjust only a size of the watched content according to the watched area.

FIG. 8B illustrates a screen for displaying an image viewer 803, which is a watched content between contents 801 and 803 having been displayed, on a watched area 822, and an execution screen 801 of an application providing calendar and weather information on a non-watched area 820, when the deformed display unit is divided into the non-watched area 820 and the watched area 822.

FIG. 8C illustrates a screen of an electronic device which automatically rotates an image viewer 803, which is a watched content between contents 801 and 803 having been displayed, on a watched area 822 and displays the rotated image viewer 803, when the deformed display unit is divided into a non-watched area 820 and the watched area 822.

FIG. 8C is the screen of the electronic device which rotates the content to allow the content to be displayed in a normal direction.

FIG. 9 illustrates screens on a deformed display unit in an electronic device according to an embodiment of the present disclosure.

Referring to FIG. 9, the electronic device is a flexible device including a flexible display as a display means.

In this display device, a display unit can be deformed by an external force. Here, the deformation means that a shape of the display unit is changed by the external force as being bent, curved, folded, rolled, stretched, twisted, unfolded, or twinkled.

That is, the electronic device can display contents through a deformed display unit. The content is an object capable of being displayed on the electronic device, includes image data, multimedia data, document data, or web browser screen. Furthermore, displaying the content can be displaying an application execution screen, or displaying a home screen including icons or widgets of applications.

Furthermore, the electronic device can simultaneously display a plurality of contents. As an example, the electronic device can simultaneously execute an image viewer on an execution screen of an application providing calendar and weather information.

FIG. 9A illustrates a screen of the electronic device which simultaneously displays the execution screen 901 of the application providing the calendar and weather information and an execution screen 903 of the image viewer.

As described above, a display unit 900 of the electronic device is deformable.

As an example, the display unit 900 is foldable to allow the rear surface thereof to be superimposed with a reference line as a center line as the newspaper is folded.

When deformed with contents being displayed in a typical flexible display, the display unit does not display the content properly according to the deformed display unit whose appearance is changed only. That is, when the display unit is deformed in a state where the content is displayed, a shape of the display unit is changed and a portion of the displayed content deviates from a user's visible area.

When the display unit is folded in half, the content should have been displayed on the folded display unit. However, when the display unit is folded in half with the content being displayed, the displayed content is also displayed as being folded.

In order to solve the above-described limitation, when the display unit is deformed in the electronic device according to the present disclosure, the electronic device distinguishes a watched content that the user closely watches among the displayed contents.

At this time, the electronic device can distinguish the watched content among the currently displayed contents through a sensor capable of tracking a focus of the pupils of the user.

In addition, the electronic device confirms the watched area corresponding to the user's visible area in the deformed display unit.

As an example, when the display unit is folded in half by the user, an area on which contents can be displayed is divided into front and rear surfaces. In this case, an area where the content can be displayed in a direction corresponding to the user's visible area can be the watched area.

At this time, the electronic device can confirm the watched area by using a sensor or a camera capable of tracking the user or by using a sensor capable of measuring movement of the electronic device.

Then, the electronic device displays a watched content among the currently displayed contents on the watched area. At this time, the electronic device changes not only a display position of the content but also a size of the content according to a size of the deformed display unit. As an example, since a size of the watched area of the deformed display unit is reduced, it is better to make a size of the displayed content smaller and display the content. The electronic device can reduce power consumption by displaying only the watched content on the watched area and not by displaying rest of the contents.

FIG. 9B illustrates a screen for displaying 922 only an image viewer 903, which is a watched content between contents 901 and 903 having been displayed, on a watched area 920, and not displaying an execution screen 901 of an application providing calendar and weather information, when the deformed display unit is divided into the non-watched area 910 and the watched area 920.

FIG. 9C illustrates a screen of an electronic device which automatically rotates an image viewer 903, which is a watched content between contents 901 and 903 having been displayed, on a watched area 920 and displays 924 the rotated image viewer 903, when the deformed display unit is divided into a non-watched area 910 and the watched area 920. At this time, the electronic device does not display the application providing calendar and weather information in order to reduce power consumption.

FIG. 9C is the screen of the electronic device which rotates the content to allow the content to be displayed in a normal direction.

FIG. 10 is illustrates screens on a deformed display unit in an electronic device according to an embodiment of the present disclosure.

Referring to FIG. 10, the electronic device is a flexible device including a flexible display as a display means.

In this display device, a display unit can be deformed by an external force. Here, the deformation means that a shape of the display unit is changed by the external force as being bent, curved, folded, rolled, stretched, twisted, unfolded, or twinkled.

That is, the electronic device can display contents through a deformed display unit. The content is an object capable of being displayed on the electronic device, includes image data, multimedia data, document data, or web browser screen. Furthermore, displaying the content can be displaying an application execution screen, or displaying a home screen including icons or widgets of applications.

Furthermore, the electronic device can simultaneously display a plurality of contents. As an example, the electronic device can simultaneously execute an image viewer on an execution screen of an application providing calendar and weather information.

Figures 10A, 10B, 10C:
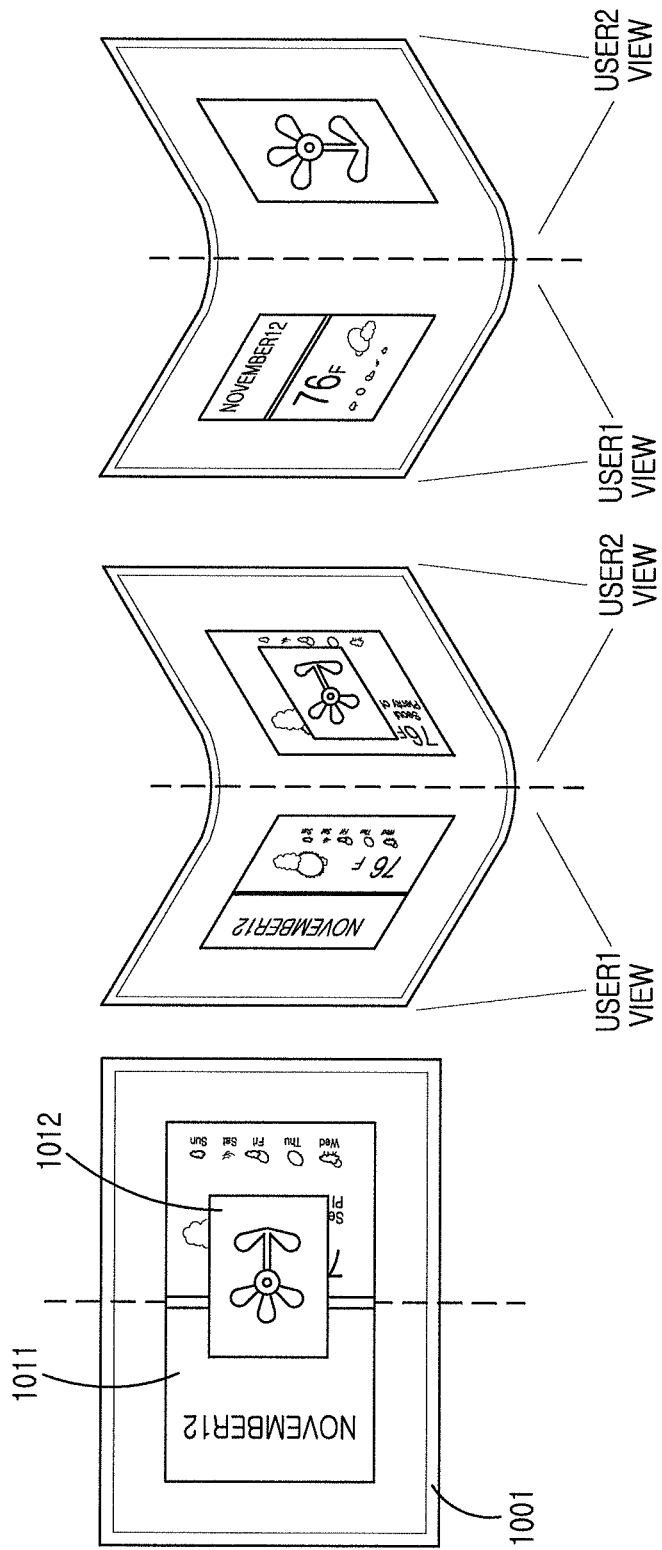
FIGS. 10A, 10B and 10C illustrate screens on a deformed display in an electronic device according to an embodiment of the present disclosure.

FIG. 10A illustrates a screen of the electronic device which simultaneously displays the execution screen 1011 of the application providing the calendar and weather information and an execution screen 1012 of the image viewer.

As described above, a display unit 1001 of the electronic device is deformable.

As an example, the display unit 1001 is foldable to allow the rear surface thereof to be superimposed with a reference line as a center line as the newspaper is folded.

When a flexible display unit is deformed with contents being displayed on it, the display unit does not display the content properly on the deformed display unit. That is, when the display unit is deformed in a state where the content is displayed, a shape of the display unit is changed and a portion of the displayed content deviates from a user's visible area.

When the display unit is folded in half, the content should have been displayed on the folded display unit. However, when the display unit is folded in half with the content being displayed, the displayed content is also displayed as being folded.

However, the electronic device according to the present disclosure can display different elements on each area of the deformed display unit. That is, when the display unit is folded in half as described above, a first element can be displayed on one surface of the folded display unit and a second element can be displayed on the other surface.

At this time, when two or more users watch content, different elements can be displayed on the deformed display.

As an example, the electronic device can track users to determine elements that each user watches, and display the content that each user watches on a watched area corresponding to each user.

FIG. 10B illustrates that the deformed display unit is divided into first and second watched areas. Here, the displayed contents are divided into a first content that a first user watches and a second content that a second user watches.

Then, the electronic device displays the first content on the first watched area, and the second content on the second watched area.

Due to this, a plurality of users can watch different contents using one electronic device.

FIG. 10C illustrates that the deformed display unit is divided into first and second watched areas. Here, the displayed contents are divided into a first content that a first user watches and a second content that a second user watches.

Then, the electronic device automatically rotates the first content and displays the rotated first content on the first watched area, and automatically rotates the second content and displays the rotated second content on the second watched area.

According to the electronic device and method for displaying contents according to the present disclosure, even when the display unit is deformed by a user, the content having been displayed can be continuously watched by automatically moving the content to a user's visible area and displaying the content.

It will be appreciated that embodiments of the present disclosure according to the claims and description in the specification can be realized in the form of hardware, software or a combination of hardware and software. Any such software can be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method for operating an electronic device, comprising:
    displaying two or more objects on a display unit;
    detecting that a display unit is folded into two portions; and
    displaying a first object among the two or more objects on a first portion of the two portions of the display unit, and a second different object among the two or more objects on a second portion of the two portions of the display unit.

2. The method of claim 1, further comprising:
    recognizing a location of at least a part of a user's body;
    detecting a visible display area on the folded display unit based on the recognition; and
    displaying content on the visible display area,
    wherein the visible display area comprises at least one portion of the folded display unit that is visible to the user,
    wherein displaying the content on the visible display area comprises:
        distinguishing at least one content watched by a user among a displayed plurality of contents; and
        displaying the distinguished at least one content on the visible display area.

3. The method of claim 2, wherein detecting the visible display area comprises:
    obtaining information regarding a user's eye direction or a user's position; and
    detecting the visible display area corresponding to a user's eye direction or a user's position.

4. The method of claim 2, wherein displaying the content on the visible display area comprises:
    displaying respective different contents on a plurality of visible display areas for different users based on each user's eye direction or each user's position.

5. The method of claim 2, wherein displaying the content on the visible display area comprises adjusting at least one of a size, a resolution, a direction of the displayed content and displaying the adjusted content.

6. The method of claim 2, further comprising:
    stopping the display of the at least one content that the user does not watch among the displayed plurality of contents.

7. An electronic device comprising:
    a display unit being deformable and configured to display content; and
    at least one processor configured to:
        cause the display unit to display two or more objects;
        detect that the display unit is folded into two portions; and
        cause the display unit to display a first object among the two or more objects on a first portion of the two portions of the display unit, and a second different object among the two or more objects on a second portion of the two portions of the display unit.

8. The electronic device of claim 7, wherein the processor is further configured to:
recognize a location of at least a part of a user's body; and
detect a visible display area on the deformed display unit based on the recognition; and
display content on the visible display area,
wherein the visible display area comprises at least one portion of the folded display unit, the at least one portion being visible to the user,
wherein the processor is further configured to:
distinguish at least one content watched by a user among a displayed plurality of contents, and
cause the display unit to display the distinguished at least one content watched by the user on the visible display area.

9. The electronic device of claim 8, wherein the processor is configured to obtain information regarding a user's eye direction or a user's position, and detect the visible display area corresponding to a user's eye direction or a user's position.

10. The electronic device of claim 8, wherein the processor is configured to cause the display unit to display respective different contents on a plurality of visible display areas for different users based on each user's eye direction or each user's position.

11. The electronic device of claim 8, wherein the processor is configured to adjust at least any one of a size, resolution, a direction of the displayed content and displays the adjusted content.

12. The electronic device of claim 8, wherein the processor is configured to stop the display of the at least one content that the user does not watch among the displayed plurality of contents.

13. A non-transitory computer readable medium having a program recorded thereon, which, when executed by a computer, performs a method of displaying contents, the method comprising:
displaying two or more objects on a display unit;
detecting that a display unit is folded into two portions; and
displaying a first object among the two or more objects on a first portion of the two portions of the display unit, and a second different object among the two or more objects on a second portion of the two portions of the display unit.

14. A method for an electronic device, comprising:
displaying a plurality of objects on a flexible display unit;
detecting that the flexible display unit is folded into two portions and at least two objects are displayed over a fold line; and
displaying a first object among the at least two objects on a first portion of the two portions of the flexible display unit, and a second different object among the at least two objects on a second portion of the two portions of the flexible display unit.

15. The method of claim 14, further comprising:
recognizing a part of user's body; and
detecting which display area is visible to the user based on the recognition; and moving at least part of content on the visible display area,
wherein the part of user's body is user's eye and the visible display area is determined based on a recognition of user's eye.

16. The method of claim 15, further comprising:
distinguishing at least one element on content watched by a user among displayed elements; and
displaying a distinguished element on the visible display area.

17. An apparatus for displaying content on an electronic device, comprising:
a flexible display unit; and
a processing circuit configured to:
cause the flexible display unit to display a plurality of objects;
detect that the flexible display unit is folded into two portions and at least two objects are displayed over a fold line; and
cause the flexible display unit to display a first object among the at least two objects on a first portion of the two portions of the flexible display unit, and a second different object among the at least two objects on a second portion of the two portions of the flexible display unit.

18. The apparatus of claim 17, wherein the processing circuit is further configured to recognize at least a part of a body of a user, wherein the part of user's body is a user's eye and a visible display area is determined based on the recognition of the user's eye.

19. The apparatus of claim 18, wherein the processing circuit is configured to:
distinguish at least one element in the content watched by the user; and
display the distinguished at least one element on the visible display area.

20. The apparatus of claim 18, where the processing circuit is configured to divide the folded display unit into a plurality of substantially flat areas and display content on one of the plurality of substantially flat areas.

* * * * *